United States Patent [19]

Loucks

[11] 4,292,817
[45] Oct. 6, 1981

[54] CONTROLLED TEMPERATURE SHIPPING ASSEMBLY

[75] Inventor: Terry L. Loucks, Spring Valley, Ohio

[73] Assignee: The Mead Corporation, Dayton, Ohio

[21] Appl. No.: 149,092

[22] Filed: May 12, 1980

[51] Int. Cl.³ ............................................. F25D 3/08
[52] U.S. Cl. ...................................... 62/457; 62/372; 62/530
[58] Field of Search ...................... 62/457, 372, 530

[56] References Cited

U.S. PATENT DOCUMENTS

| | | | |
|---|---|---|---|
| 2,393,245 | 1/1946 | Hadsell | 62/457 X |
| 2,496,296 | 2/1950 | Lobl | 62/457 X |
| 3,436,932 | 4/1969 | Paquin | 62/457 |
| 3,807,194 | 4/1974 | Bond | 62/457 |
| 4,134,276 | 1/1979 | Lampard | 62/457 X |

FOREIGN PATENT DOCUMENTS 209569 7/1957 Australia ........................... 62/457

Primary Examiner—Lloyd L. King
Attorney, Agent, or Firm—Stephen H. Cagle; C. N. Shane, Jr.; Wilson G. Palmer

[57] ABSTRACT

A controlled temperature shipping assembly is disclosed which comprises a container, a plurality of liquid retention members and temperature control means. The container includes both an outer protective layer and an inner insulating layer. The outer protective layer and the insulating layer define a shipping cavity containing the liquid retention members and the temperature control means. The liquid retention members are removably positioned in the shipping cavity such that at least one surface of each of the liquid retention members is in direct contact with at least one surface of the temperature control means. The temperature control means are positioned in the shipping cavity such that the temperature of each of the liquid retention members can be controlled below predetermined levels.

8 Claims, 4 Drawing Figures

CONTROLLED TEMPERATURE SHIPPING ASSEMBLY

BACKGROUND OF THE INVENTION

1. Field of the Invention

The present invention relates to a controlled temperature shipping assembly and in particular a shipping assembly whereby wastewater samples or the like can be shipped at predetermined controlled temperatures.

2. Prior Art

A great variety of temperature controlled containers are found in the prior art. These include for the most part various types of refrigeration apparatus. In particular, it is noted that the need has existed for some time to store and ship foods, confections and the like at low temperatures to prevent spoilage or other forms of degredation prior to actual use of product. It is further noted that temperature controlled shipping containers must be designed for the specific use to which they are intended.

In particular, if food or confection items are to be shipped it may be critical that a certain predetermined temperature level or range be maintained. On the other hand, if biological degredation is to be curtailed in the shipment of, for example, blood samples or blood bank transfers, another temperature and another size container must be used. Likewise, standard containers such as Styrofoam picnic containers or other types of refigeration means have been well known in the prior art and each is adapted to the specific end use for which it is intended. In this same line, applicant's controlled temperature shipping assembly is unique in this application to the shipping of wastewater samples under appropriate storage and temperature conditions. It should be understood that the term "ship" or "shipping" is used herein in the generic sense to refer to any means of transportation.

It has been previously known to store goods which are sensitive to temperature in thermally insulated containers in which so-called cooling blocks are housed. One simple example of such a container is that used by housewives to store food. In this case, the interior of the thermal container need only be kept cool for a relatively short period of time. Because of this, and because direct contact of food with the cooling block is not normally harmful, it suffices to freeze the block to the necessary temperature prior to using the same. The block can then be chilled to the required temperature in a domestic refrigerator, for example.

In their simplest form, the cooling blocks are filled solely with water, which when frozen has a high heat of fusion and consequently is able to maintain the food in a cool environment for a considerable period of time. Such an apparatus is effective to keep food wholesome or to keep beverages cool for a certain period of time at ambient temperatures which lie above the desired storage temperatures.

In the case, however, of the storage or transportation of blood, blood components and many other substances, both living and dead, for example certain organisms, vaccine, serum, bacteriological and biological substances, enzymes, pharmicological substances, electronic components, films and chemical substances, measures must be taken to insure that the object to be stored can be constantly kept within a predetermined specific temperature range, often at extremely close tolerances.

Thus it can readily be seen that shipping assemblies and the like for the storage of material which must be maintained within a certain temperature range or at a constant temperature must be custom designed to the particular end use desired. As mentioned hereinabove, applicant's shipping assembly is specifically designed for the transport of wastewater samples and like materials at temperatures and for a duration which will inhibit or prevent the biological or chemical degradation of the samples. The guidelines and regulations concerning such shipping are generally promulgated by regulatory agencies such as the Environmental Protection Agency, Food and Drug Administration and other Government agencies.

U.S. Pat. No. 1,576,955 to Dubraks discloses generally a refrigeration apparatus which might typically have been used to maintain the temperature of food or confection type material. Dubraks requires wood or sheet metal outer and inner containers filled with insulating material such as granulated cork. It seems obvious that an apparatus such as that defined in Dubraks is not meant for convenient shippage due to its weight, bulk and size.

U.S. Pat. No. 1,678,763 to Bolger discloses a rack for supporting a centrally disposed ice cream container with chemical containers arranged about the central container for refrigeration purposes. This arrangement is typical of prior art refrigeration means and is deficient in that it is not actually shippable or packable and in that it is designed specifically and only for the storage of ice cream.

U.S. Pat. No. 2,555,126 to Greve discloses a portable icebox in which a number of individual containers are fixedly placed in the four corners of the icebox. The Greve patent is typical of portable icebox arrangements wherein various items to be refrigerated are placed throughout the container and wherein ice is scattered in between. This container is portable in that it can be carried although it must be noted that this would in all likelihood not be suitable for shipping or mailing purposes.

U.S. Pat. No. 2,989,856 to Telkes discloses a shipping container in which temperature control is maintained. In the Telkes shipping container, it should be noted that the chemical reaction which takes place in the material in the makeup of the container is important in maintaining the proper temperature.

U.S. Pat. No. 3,810,367 to Peterson discloses a shipping container for the storage and shipping of a human transplant organ. As with other shipping containers of this type, the container must be specifically designed for the end use to which it is placed. Along this same line, U.S. Pat. No. 4,145,895 to Hjertstrand discloses an apparatus for storing goods at stable temperatures in a heat insulated container. The storage container of Hjerstrand is for the storage of blood samples or blood transfusion material. As before, this container is specifically designed for constant temperature storage for blood samples.

Accordingly, it is an object of this invention to provide a controlled temperature shipping assembly which will enable the storage, maintenance and shipping of a plurality of wastewater samples at lower temperatures than had previously been generally available in the prior art.

It is a further object of this invention to provide a controlled temperature shipping assembly which will permit the extended storage of wastewater samples for time periods up to 84 hours at controlled temperatures.

It is a still further object of this invention to provide a controlled temperature shipping assembly which is smaller and stronger than containers generally available in the prior art to prohibit excess size and waste space within the container as well as to prevent breakage of containers and bottles within the shipping assembly.

These and other objects of this invention will become apparent from the description of the preferred embodiment.

SUMMARY OF THE INVENTION

A controlled temperature shipping assembly is disclosed which comprises a container, a plurality of liquid retention members and temperature control means. The container includes both an outer protective layer and an inner insulating layer. The outer protective layer and the insulating layer define a shipping cavity containing the liquid retention members and the temperature control means. The liquid retention members are removably positioned in the shipping cavity such that at least one surface of each of the liquid retention members is in direct contact with at least one surface of the temperature control means. The temperature control means are positioned in the shipping cavity such that the temperature of each of the liquid retention members can be controlled below predetermined levels.

DETAILED DESCRIPTION OF THE PREFERRED EMBODIMENT

Figure 1:
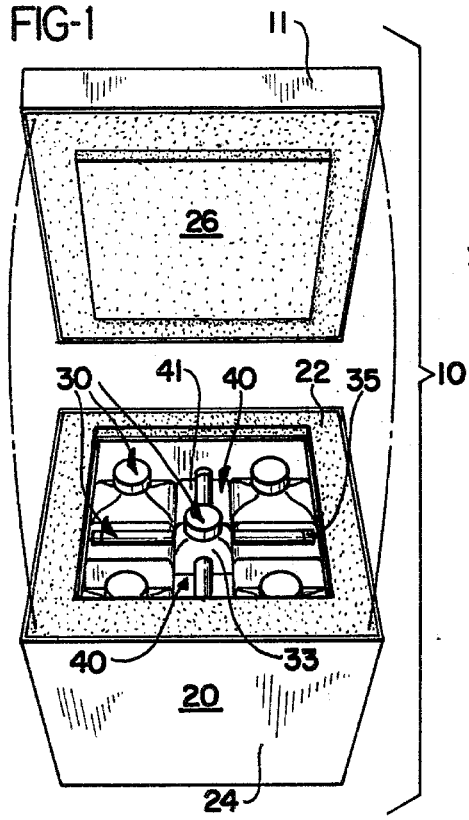
FIG. 1 is a perspective view of the controlled temperature shipping assembly of this invention with the top removed and with the shipping containers in place.

For the purposes of promoting and understanding of the principles of the invention, reference will now be made to the embodiment illustrated in the drawing and specific language will be used to describe the same. It will nevertheless be understood that no limitations of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, it can be seen that the controlled temperature shipping assembly 10 of this invention comprises in its broadest form a container 20, liquid retention members 30, and temperature control means 40.

The container portion 20 of shipping assembly 10 includes an outer protective layer 21 and an inner insulating layer 22. Optionally, container 20 also includes an inner protective layer 23. Members 21, 22 and 23 can be seen most effectively in FIG. 2.

In the preferred embodiment of this invention outer protective layer 21 is made from a fibrous material such as linerboard, cardboard or the like. Outer layer 21 must have an outer surface 24 which is either printable or else is receptive to adhesives for the application of printed labels and the like. Outer protective layer 21 is preferably from about ¼" to about 1/16" in thickness although the particular dimensions are not critical. Characteristics such as water resistivity, durability, strength and other such characteristics which are beneficial in any shipping container are desirable to be emphasized in the outer protective layer 21 of container 20.

Inner insulating layer 22 in the preferred embodiment of this invention comprises a foamed plastic type material. This material is preferably from about 1" to about 6" in thickness although the dimensions are not critical. The materials which are useful in forming this foamable material are well known and do not form a part of this invention. However, it has been shown that polystyrenes, polyurethanes and other polymeric materials have well known foaming characteristics. As a general characteristic it can be stated that the better the thermal insulating properties that the foam material exhibits, the more utility it will have in the invention described herein. Inner insulating layer 22 abuts against outer protective layer 21 and optionally may be adhesively fixed to outer protective layer 21. This is, however, purely optional. Additionally, inner insulating layer 22 may be in one or more pieces. Furthermore, the dimensions of the wall may be uniform or may be varied to meet individual needs.

Figure 3:
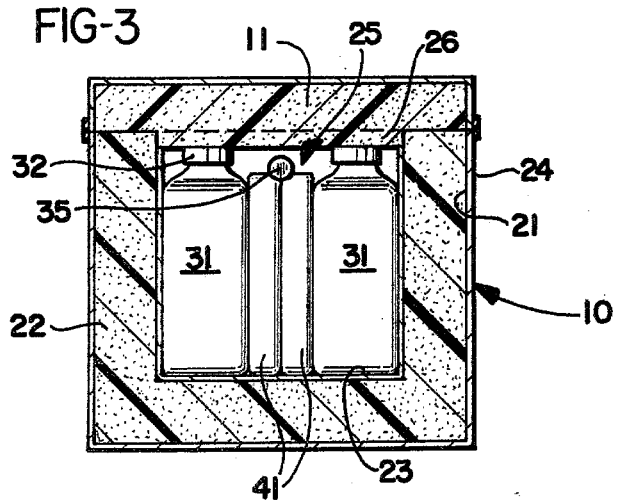
FIG. 3 is a side view along a line 33 in FIG. 2 showing the controlled temperature shipping assembly of this invention in place during actual shipping.

It should be noted that outer protective layer 21 and insulating layer 22 must of necessity come in at least two parts to permit a top 11 to be formed to permit insertion and withdrawal of liquid retention members 30. This top is illustrated in FIGS. 1 and 3. As shown in the drawing, the inner insulating layer 22 which forms a portion of the top 11 as well as the outer protective layer 21 which forms a portion of the top 11 are sized equivalent to the portions of 21 and 22 which define the shipping cavity 25. While this is so in the preferred embodiment of this invention, it is not critical to the functioning of this invention and the particular size, thickness and other characteristics of members 21 and 22 can be varied according to individual requirements. Top 11 should be sized so as to be fitably received by shipping cavity 25 as is more particularly pointed out and described in FIG. 3.

Figure 4:
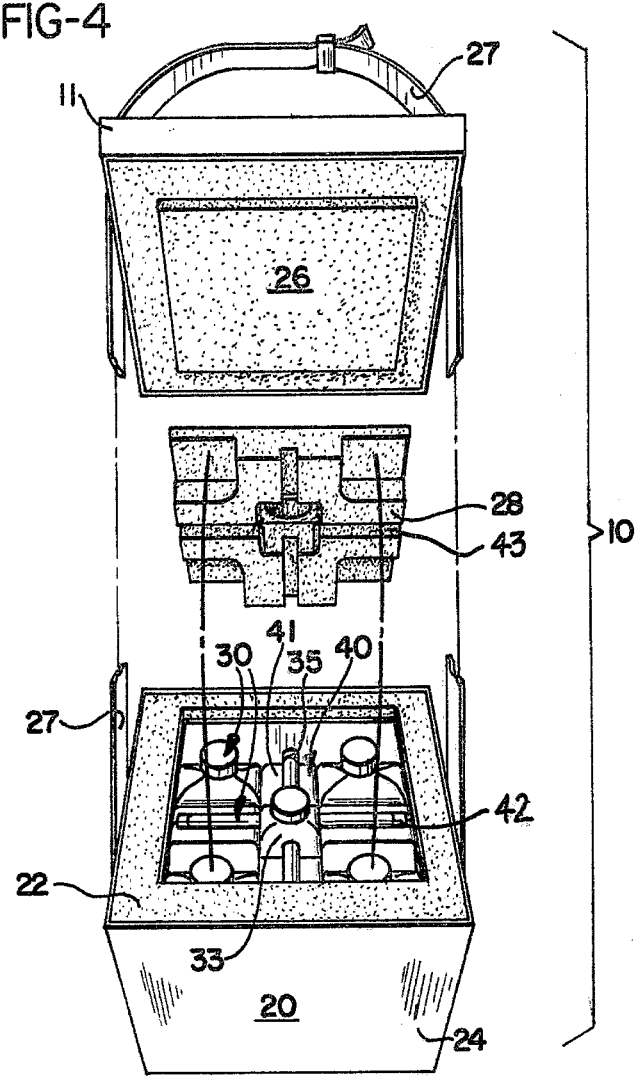
FIG. 4 is a perspective view of an alternate embodiment of the controlled temperature shipping assembly of this invention.

In the most preferred embodiment of this invention an insulation member 28 is used as is shown more particularly in FIG. 4. In the embodiment illustrated by FIG. 4, member 28 includes cavity portion 43 which mate with cavity 42 in ice packs 41 to form a protective enclosure for 40 ml vials 35. Note that member 28 has a fitted opening to receive the top of one 500 ml plastic bottle 33. In practice the member 28 is inserted into shipping cavity 25 and top member 11 fits down on top of member 28. Regardless of whether or not an insulating member 28 is used, it is necessary that the liquid retention members 30 be restrained in the area in which they are permitted to move. In an alternate embodiment, member 28 can be attached to or an integral part of top 11.

Inner protective layer 23 is optional, although would be present in the preferred embodiment of this invention. Inner protective layer 23 can be made from a fibrous material similar to that which is used to make outer protective layer 21 or in the preferred alternative can be made from a foamed plastic material similar to that used to make inner insulating layer 22. In this regard, inner protective layer 23 is preferably foamed to a harder consistency and is made from one or more pieces. It should be noted in certain preferred embodiments of this invention that top member 26 of inner protective layer 23 is sized to fitably receive the top portions of certain liquid retention members 30. Such a fitted arrangement insures that a minimum of breakage and movement will occur within the shipping cavity 25 during actual handling and shipping.

When combined, outer protective layer 21, inner insulating layer 22 and inner protective layer 23 define shipping cavity 25 into which a plurality of liquid retention members 30 can be placed for storage, shipping and handling.

Figure 2:
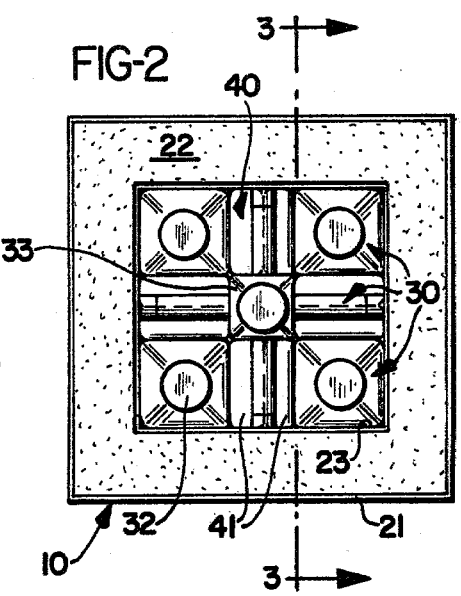
FIG. 2 is a top view of the controlled temperature shipping assembly of this invention wherein the smaller containers have been removed to show the portion wherein these materials are nested during shipping.

The liquid retention members 30 which are useful in the shipping assembly 10 of this invention can be any of a variety of well known, established commercial sizes. In the most preferred embodiment of this invention as is illustrated by FIG. 2, the liquid retention members 30 come in three sizes. Quart bottles 31 are located at each corner of the shipping cavity 25. These quart bottles 31 are conventional in nature and preferably have a substantially square or rectangular cross-sectional area to prevent shifting and other movement in the shipping cavity 25. Optionally, however, the quart bottles 31 can be made of plastic or other materials which are suitable for retaining the samples being shipped. Preferably, the quart bottles are closed at the top by conventional screw top means 32.

In addition to the four quart bottles 31 at the corners of shipping cavity 25, two 500 ml plastic bottles 33 are found in the central portion of shipping cavity 25. Plastic bottles 33 are similar in cross-sectional area to quart bottles 31 and can contain any of a variety of materials. As with quart bottles 31, plastic bottles 33 can preferably be plastic but also optionally can be made from glass or other suitable retention means. In addition, four 40 ml vials identified as number 35 are enclosed. These vials 35 have shown utility in obtaining samples for volatile organic analysis. Again, these are conventional 40 ml vials made from glass, plastic or other materials and closed by conventional means. However, it is possible to use specially designed 40 ml vials which permit the inclusion of samples followed by the removal of air. The particular type, size and figuration or construction of the liquid retention members 30 of this invention are not asserted to be an inventive feature herein. Rather, the unique arrangement of liquid retention members 30 in the shipping cavity 25 is asserted to be a novel and unique feature of the shipping assembly 10 of this invention.

The temperature control means 40 of this invention comprise specifically placed blue ice packs 41. The temperature control means 41 are placed at four separate locations throughout the shipping cavity 25 in the fashion such that at least one surface of each liquid retention member 30 is in direct contact with at least one of the blue ice packs 41. In most instances, two or more surfaces are in direct contact. This serves the dual function of providing direct transfer of cooling energy to the liquid retention members 30 while at the same time making most economical possible use of the blue ice packs 41.

It is important to note in blue ice packs 41 that the cavity 42 which is designed to be receptive to 40 ml vials 35 as is shown in FIGS. 1 and 3. Note that the blue ice packs 41 are specifically sized so that there is no appreciable free space between the liquid retention members 30 and the temperature control means 40. In many instances, this involves the joining of two or more blue ice packs 41 together to form a single temperature control mean 40 or depending on the size of the liquid retention means may involve less than two or more than two. The actual number and size of blue ice packs 41 is completely optional based on the space displacement in shipping cavity 25 of liquid retention members 30. As can be appreciated by one skilled in the art, there are an infinite variety of sizes and shapes of containers which may be used in the shipping assembly 10 of this invention.

In practice, it has been found that it is most advisable to place the temperature control means 40 into a freezer section of a refrigerator for a sustained period of time prior to use. This insures that the temperature control means 40 will maintain the liquid retention members 30 at or below 4° C. throughout actual shipment.

As has been previously stated, the intended use of the shipping assembly 10 of this invention is for forwarding wastewater samples and the like to analytical laboratories for testing. The Environmental Protection Agency as well as other Federal regulatory agencies have published strict guidelines to insure that sampling and analysis are uniform throughout the industry. Therefore, it is essential according to the EPA protocol that temperatures in the shipping container be maintained at or below 4° C. during the entire shipping and handling period. It is furthermore an EPA requirement that the wastewater samples be analyzed within 24 hours of actual sampling. Current practice is to use a few blue ice packs or a bag of crushed ice in a conventionally designed shipping container. Unfortunately, blue ice does not maintain a 4° C. temperature unless it contacts all the sample bottles directly. Furthermore, crushed ice melts and bottles or sampling containers frequently break while floating around in the resulting water. These problems which have been long appreciated by the prior art are solved by use of the shipping assembly 10 of this invention.

Testing protocol also requires that several different bottles be used for transporting the samples. A variety of sizes, shapes and materials for these different bottles makes it very difficult to protect all of the breakage while keeping them in close proximity to the blue ice. The better the sample bottles are protected against damage by plastic bubble packing, polyfoamed peanuts, cardboard, etc., the more they are thermally insulated from the blue ice. Therefore, the prior art efforts to protect the sample bottles from breakage work to the detriment of the temperature maintenance requirement.

An additional requirement for shipping assemblies 10 useful in sampling of wastewater is that the shipping container must be as small and lightweight as possible, both for convenience and lower shipping costs. Current procedure involves wrapping sample bottles to protect them against damage and placing sufficient blue ice or crushed ice around them to lower the temperature to below 4° C. This results in a relatively large and heavy shipping container or in compromises in temperature, breakage or both.

As can be appreciated, the shipping assembly 10 of this invention eliminates breakage, maintains temperature below 4° C. for well over 72 hours and is much smaller and lighter in weight than those containers currently in use. These desired results are achieved by the unique arrangement of bottles and temperature control means in the specifically designed container 20. It should be noted that by placing the container 20, liquid retention members 30 and temperature control means 40 specifically in the arrangement as detailed and shown herein, all of the sample bottles can be arranged with the advantages that every bottle is in direct contact with one or more blue ice packs and that five of the six sides of every blue ice pack are utilized in contact with sample bottles.

This arrangement optimizes the cooling capacity of the blue ice while simultaneously separating the various sample bottles from one another. This eliminates the requirement for additional packing materials to protect samples against damage. Furthermore, the blue ice itself acts to separate the sample bottles, in addition to providing better thermal protection by contacting the bottles directly. Since this arrangement is very compact, it allows for more blue ice and thicker insulating walls; and yet, the resulting container is smaller and lighter in weight than has been thought achievable in the prior art. It should be understood that the term "blue ice" is used herein to generally describe the variety of cooling and refrigeration means which are available in the marketplace. Some of these involve retained water or other freezable liquid while still others rely on a chemical reaction to produce the cooling energy. Regardless of the source of cooling energy, it should be understood that blue ice refers to any such devices which are appropriately functional and sized.

The specific contents of the liquid retention members 30 is not critical. Although in the preferred application it is intended to transport wastewater and other types of water samples, the packaging and shipping innovation of this invention would be equally applicable to any other liquids such as medicines, blood serums, animal specimens, food and the like. The shipping container is optimum relative to breakage, cooling, size and weight for a variety of applications.

Optionally, a strap or other retaining means 27 can be used to maintain the proper alignment and positioning of top members 11 and 26 relative to shipping cavity 25. Other suitable retaining means would include but not be limited to tape, string, adhesives, wrapping material or combinations of these materials.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention are desired to be protected.

What is claimed is:

1. A controlled temperature shipping assembly comprising a container, a plurality of liquid retention members, temperature control means, and a top closure insulating member, said container including an outer protective layer and an inner insulating layer, said protective layer and said insulating layer defining a shipping cavity; said liquid retention members being removably positioned in said shipping cavity, said liquid retention members being arranged such that at least one surface of each of said retention members is in direct contact with at least one surface of said temperature control means; temperature control means positioned in said shipping cavity such that the temperature of each of said liquid retention members can be controlled below predetermined levels and wherein said top closure insulating member is fitably received by said shipping cavity and at least one of said liquid retention members and which encloses and insulates the shipping cavity during actual transport or storage.

2. The controlled temperature shipping assembly of claim 1 wherein said container comprises an outer protective layer made from a fibrous material and said inner insulating layer comprises a foamed thermoplastic material and wherein said container further comprises an inner protective layer.

3. The controlled temperature shipping assembly of claim 1 wherein said container further includes an inner protective layer.

4. The controlled temperature shipping assembly of claim 1 wherein said plurality of liquid retention members comprise from about 6 to about 12 individual bottles.

5. The controlled temperature shipping assembly of claim 1 wherein the temperature control means comprise a plurality of blue ice containers arranged in said shipping cavity such that at least one surface of each of said plurality of liquid retention members is in direct contact with at least one surface of said blue ice packs, and wherein each of said blue ice packs has a total of at least six surfaces, at least five of said at least six surfaces being in direct contact with at least one of said liquid retention members.

6. The controlled temperature shipping assembly of claim 1 further comprising retaining means for maintaining the proper alignment of said shipping assembly during handling.

7. A controlled temperature shipping assembly comprising a container, a plurality of liquid retention members, temperature control means, and a top closure insulating member, said container including an outer protective layer made from a fibrous material, an inner insulating layer comprising a foamed thermoplastic material and an inner protective layer, said layers defining a shipping cavity; said liquid retention members being removably positioned in said shipping cavity; temperature control means positioned in said shipping cavity such that the temperature of each of said liquid retention members can be controlled below predetermined levels and wherein said temperature control means comprises a plurality of blue ice containers arranged in said shipping cavity such that at least one surface of each of said plurality of liquid retention members is in direct contact with at least one surface of said blue ice packs, and wherein each of said blue ice packs has a total of at least six surfaces, at least five of said at least six surfaces being in direct contact with at least one of said liquid retention members and wherein said top closure insulating member is fitably received by said shipping cavity and at least one of said liquid retention members and which encloses and insulates the shipping cavity during actual transport or storage.

8. The controlled temperature shipping assembly of claim 7 further comprising retaining means for maintaining the proper alignment of said shipping assembly during handling.

* * * * *